US012717662B2

(12) United States Patent
Korakolla et al.

(10) Patent No.: US 12,717,662 B2
(45) Date of Patent: Aug. 25, 2026

(54) SYSTEM AND METHOD FOR AUTOMATIC TRANSFER OF GLOBAL VARIABLES BETWEEN APPLICATION SCREENS

(71) Applicant: Rakuten Symphony, Inc., Tokyo (JP)

(72) Inventors: Keerthi Korakolla, Tokyo (JP); Sneha Barman, Singapore (SG); Keshav Sharma, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 988 days.

(21) Appl. No.: 17/918,465

(22) PCT Filed: May 5, 2022

(86) PCT No.: PCT/US2022/027785
§ 371 (c)(1),
(2) Date: Nov. 9, 2023

(87) PCT Pub. No.: WO2023/214968
PCT Pub. Date: Nov. 9, 2023

(65) Prior Publication Data

US 2024/0211325 A1 Jun. 27, 2024

(51) Int. Cl.
*G06F 9/54* (2006.01)
*G06F 9/451* (2018.01)

(52) U.S. Cl.
CPC .............. *G06F 9/543* (2013.01); *G06F 9/451* (2018.02)

(58) Field of Classification Search
CPC ................................ G06F 9/543; G06F 9/451
See application file for complete search history.

(56) References Cited

U.S. PATENT DOCUMENTS 9,438,708 B2 * 9/2016 Kamii ................. H04M 1/0266
2009/0031112 A1 * 1/2009 Behrens ................. G06Q 10/06 712/207
2012/0005603 A1 * 1/2012 Chinuki .................... G06F 8/30 715/762
2013/0024759 A1 1/2013 Yuan
2013/0132341 A1 * 5/2013 Hong ...................... G06F 9/544 707/618
2018/0063140 A1 * 3/2018 D ............................ H04L 63/10
(Continued)

OTHER PUBLICATIONS

International Search Report issued Sep. 12, 2022 in International Application No. PCT/US22/27785.
(Continued)

*Primary Examiner* — Tadesse Hailu
(74) *Attorney, Agent, or Firm* — Sughrue Mion, PLLC

(57) ABSTRACT

A method, performed by at least one processor of a computing device, for automatically transferring information from one screen to another, includes: outputting a first screen of a first application opened on a platform; outputting a second screen of a second application opened on the platform, while the first screen is output; determining whether a global variable is included for a user input field of the second screen; based on determining that the global variable is included for the user input field of the second screen, obtaining a value of the global variable from the first screen; and including the obtained value of the global variable in the user input field, of the outputted second screen, corresponding to the global variable.

20 Claims, 9 Drawing Sheets

(56) References Cited

U.S. PATENT DOCUMENTS

| | | | | |
|---|---|---|---|---|
| 2019/0220813 | A1* | 7/2019 | Madisetti | G06Q 20/405 |
| 2019/0286425 | A1* | 9/2019 | Niwa | G05B 19/0426 |
| 2019/0317846 | A1* | 10/2019 | Liu | G06F 8/60 |
| 2023/0136606 | A1* | 5/2023 | Tang | G06F 9/5016 718/104 |

OTHER PUBLICATIONS

Written Opinion issued Sep. 12, 2022 by the International Searching Authority in International Application No. PCT/US22/27785.

* cited by examiner

FIG. 3

Global Variable
GV Category 1

- [x] #GL_CUSTOMER_MOBILE_NUMBER#
- [ ] #GL_CUSTOMER_ACCOUNT_NUMBER#
- [ ] #GL_CUSTOMER_ACCOUNT_STATUS#

FIG. 6

SYSTEM AND METHOD FOR AUTOMATIC TRANSFER OF GLOBAL VARIABLES BETWEEN APPLICATION SCREENS

BACKGROUND

In related art information processing systems, two different applications typically cannot transfer user input information between each other without manual or user intervention. That is, in the related art, two different applications running concurrently on the system do not communicate with each other. As a result, if data corresponding to a particular variable or input field is to be copied from a screen or window of a first application to a user input field of a screen or window of a second application, a user would generally have to manually scan the screen or window of the first application to locate the data, and then copy-and-paste or type the data into the user input field of the screen or window of the second application. Such a manual process is time-consuming and prone to human error (e.g., input of an incorrect value or typographical error).

To avoid such manual input processes, another related art method for populating a user input field of an application with external data is to store the data in a database. In this case, the data is fetched from the backend database using an application programming interface (API) any time it is needed. This related art method, however, requires a backend connection to a database, and utilizes additional network resources and bandwidth.

SUMMARY

According to embodiments, systems and methods are provided for defining and automatically transferring global variables directly between open screens of two different applications, without requiring manual input or fetching from a backend database over a network.

According to embodiments, a method, performed by at least one processor of a computing device, for automatically transferring information from one screen to another, includes: outputting a first screen of a first application opened on a platform; outputting a second screen of a second application opened on the platform, while the first screen is output; determining whether a global variable is included for a user input field of the second screen; based on determining that the global variable is included for the user input field of the second screen, obtaining a value of the global variable from the first screen; and including the obtained value of the global variable in the user input field, of the outputted second screen, corresponding to the global variable.

The determining whether the global variable is preset to be transferred from another screen to the second screen may include: determining one or more global variables predefined in the platform; and determining whether the global variable, from among the one or more global variables predefined in the platform, is preset to be transferred from another screen to the second screen.

The determining whether the global variable is preset to be transferred may include determining whether a mapping key is set for automatically transferring the value of the global variable, from among the one or more global variables, from an open screen of another application to the second screen.

The obtaining the value of the global variable from the first screen may include obtaining the value of the global variable using the mapping key.

The first screen and second screen may both be output for display within a same tab of a browser.

The first screen and the second screen may be two different micro frontends of a same microservices domain.

The obtaining the value of the global variable from the first screen may include determining whether the value of the global variable is published by the first application on an event bus.

The obtaining the value of the global variable from the first screen may further include obtaining the value from the event bus.

At least one other global variable may be set to be included for a third screen of the second application, and not included for the second screen; and the second screen and the third screen may correspond to different execution sessions of the second application.

According to embodiments, an apparatus for automatically transferring information from one screen to another within a platform, includes: a memory storing instructions; and at least one processor configured to execute the instructions to: control to output a first screen of a first application opened on a platform; control to output a second screen of a second application opened on the platform, while the first screen is output; determine whether a global variable is included for a user input field of the displayed second screen; based on determining that the global variable is included for the user input field of the second screen, obtain a value of the global variable from the first screen; and include the obtained value of the global variable in the user input field, of the outputted second screen, corresponding to the global variable.

The at least one processor may be further configured to execute the instructions to: determine one or more global variables predefined in the platform; and determine whether the global variable, from among the one or more global variables predefined in the platform, is preset to be transferred from another screen to the second screen.

The at least one processor may be further configured to execute the instructions to determine whether a mapping key is set for automatically transferring the value of the global variable, from among the one or more global variables, from an open screen of another application to the second screen.

The at least one processor may be further configured to execute the instructions to obtain the value of the global variable using the mapping key.

The first screen and second screen may both be output for display within a same tab of a browser.

The first screen and the second screen may be two different micro frontends of a same microservices domain.

The at least one processor may be further configured to execute the instructions to determine whether the value of the global variable is published by the first application on an event bus.

The at least one processor may be further configured to execute the instructions to obtain the value of the global variable from the event bus.

At least one other global variable may be set to be included for a third screen of the second application, and not included for the second screen; and the second screen and the third screen may correspond to different execution sessions of the second application.

According to embodiments, a non-transitory computer-readable recording medium has recorded thereon instructions executable by at least one processor to perform a method for automatically transferring information from one screen to another within a platform, the method including: outputting a first screen of a first application opened on a platform; outputting a second screen of a second application opened on the platform, while the first screen is output; determining whether a global variable is included for a user input field of the second screen; based on determining that the global variable is included for the user input field of the second screen, obtaining a value of the global variable from the first screen; and including the obtained value of the global variable in the user input field, of the outputted second screen, corresponding to the global variable.

The determining whether the global variable is preset to be transferred from another screen to the second screen may include: determining one or more global variables predefined in the platform; and determining whether the global variable, from among the one or more global variables predefined in the platform, is preset to be transferred from another screen to the second screen.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 3 is a diagram of example components of a device according to an embodiment;

FIG. 6 illustrates an example UI screen for setting or selecting one or more global variables from among predefined global variables to be transferred from another screen to the second screen, according to an embodiment;

DETAILED DESCRIPTION

Figure 1:
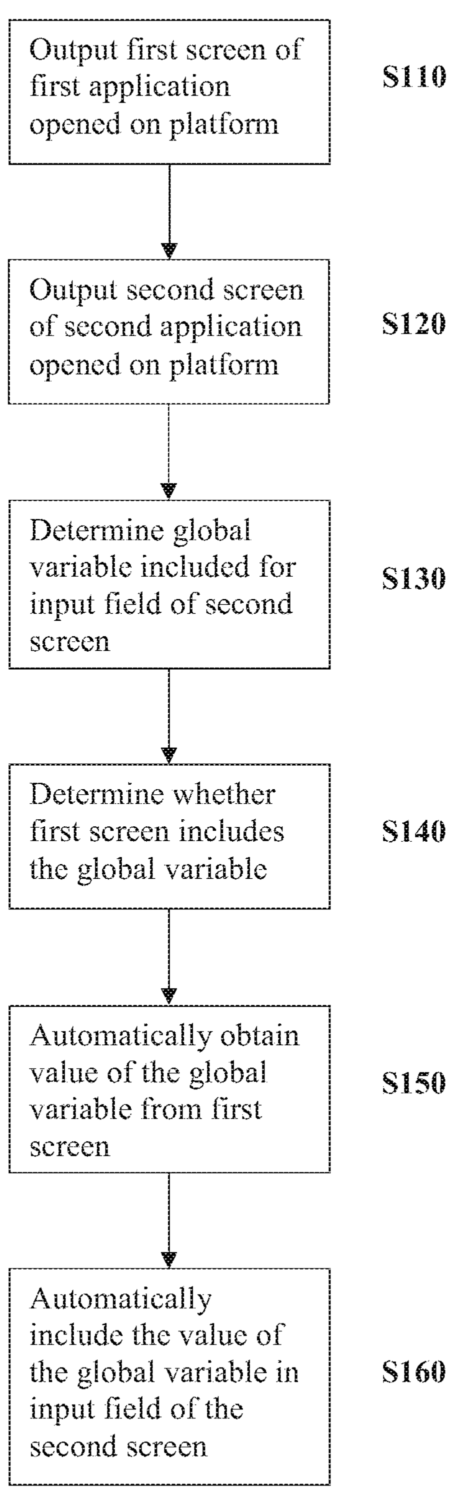
FIG. 1 is a flowchart of an example process for automatically transferring information from one screen to another of different applications opened on a platform, according to an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system in which global variables are defined in a platform and set for the automatic transfer of values thereof from one open screen of an application to another open screen of a different application. As a result, human error and time cost in inputting information to user input fields of an application interface is eliminated. Further, by directly transferring the information between open application screens, there is no need to connect to a backend database, thereby conserving network resources and bandwidth.

FIG. 1 is a flowchart of an example process for automatically transferring information from one screen to another of different applications opened on a platform, according to an embodiment. Here, the platform may refer to an application platform that hosts and/or deploys a plurality of applications. For example, the application platform may be a cloud platform including one or more servers in which the one or more applications are deployed. In this case, the application platform may be a cloud platform for a particular business or enterprise in which applications are deployed for use by employees and/or customers of the business (e.g., applications for day-to-day operations of the business, processing or inputting sales information, communicating with customers, troubleshooting, etc.). Further, the platform and applications therein may be built, hosted, and deployed in accordance with a microservices architecture. The applications in the application platform are configured to output or expose data.

Referring to FIG. 1, at operation S110, a first screen of a first application opened on the platform is output for display.

For example, the first screen may be output for display on a display unit of a client device or user terminal that accesses the first application, such as through a web browser, over a network. According to another embodiment, the first screen may be displayed on a same device that stores and executes the first application.

Hereinafter, a screen (or execution screen) may refer to a particular user interface screen or page of an application, and the output or displayed screen may be an instance of the screen. By way of non-limiting example, the first application may be a customer account application that includes a screen (e.g., first screen) in which customer account information is displayed. An instance of the screen (e.g., output first screen) may correspond to and include information of a particular customer, as shown by way of example in FIG. 7A.

At operation S120, a second screen of a second application opened on the platform is output for display. For example, the second screen may be output for display on the display unit of the client device or user terminal that accesses the second application, such as through a web browser, over the network. As above, according to another embodiment, the second screen may be displayed on a same device that stores and executes the second application.

In one or more embodiments, the first screen may be output and displayed as a background screen or window and the second screen may be output and displayed as a foreground screen or window, i.e., displayed on top of, overlapping, or in front of the background screen (e.g., a pop-up window displayed or overlaid above the second screen). Alternatively, the first and second screens may be displayed in a tiled, side-by-side, or non-overlapping manner. Moreover, one or both of the first and second screens may be minimized. Further, the first and second screens may both be displayed within a same tab of a browser window. In an embodiment where the first and second applications are deployed in a microservices architecture, the first and second screens may be micro frontends, e.g., of a same microservices domain (a model in which clusters of different data entities and processes correspond to or control a particular and significant area of functionality). According to an embodiment, upon opening the second application or upon outputting the second screen of the second application, the second application establishes an event bus with the first application.

At operation S130, it is determined whether a global variable is included for a user input field of the second screen. A global variable is a variable that can be commonly used or referenced across multiple applications in the platform. According to one or more embodiments, the global variable is predefined or preregistered in the platform and may be selected for inclusion in different screens of different applications. For example, when defining or creating the second screen that includes one or more user input fields, a developer may select one or more predefined global variables for the user input field(s) such that a value of the variable may be automatically fetched from an output screen of another application. In this case, the global variable may be defined with an input field label, and the second screen may correlate a user input field to the global variable using the label. The global variable may further be defined with a mapping key, i.e., an identifier or key of the global variable for transferring a value mapped to the key from one application screen to another.

According to an embodiment, based on opening and outputting the second screen of the second application, the system (e.g., platform or user terminal) may determine whether a global variable is included or defined for a user input field of the second screen. A method of determining whether a global variable is included for a user input field of the second screen is described in further detail below with reference to FIG. 4. In an embodiment, upon determining that the second screen includes a global variable, the second application may listen to the event bus for a respective mapping key corresponding to the global variable.

Based on determining that the global variable is included for the user input field of the second screen, it is determined whether the first screen includes (or exposes a value of) the global variable at operation S140. Then, based on determining that the first screen includes the global variable, a value of the global variable (e.g., value for the mapping key) is automatically obtained from the first screen at operation S150 and included in the corresponding user input field of the outputted second screen at operation S160.

For example, the global variable may be predefined or registered in the platform with a mapping key, as described above. In this case, the method may determine whether the first screen includes the global variable and may obtain a value mapped to the key corresponding to the global variable in the first screen. In one embodiment, the automatic transfer of values of global variables may be in accordance with a publisher-subscriber model. For example, the first application may publish (e.g., on the event bus, channel or tunnel with the second application, etc.) any values for keys (mapping keys) set for transferring global variables defined in the platform, and the second application may obtain the published value(s) for any keys set or selected in correspondence with an input field of the second screen that is output. In an example embodiment, the second application may listen to the event bus for respective mapping keys of any global variables included or set for transfer to the second screen, and may obtain the values for the keys corresponding to the global variables published to the event bus by the first application using the mapping keys. Further, the two applications may communicate and automatically transfer values of global variables via an application programming interface (API) (e.g., using the mapping key).

According to the present embodiment, a value of a variable may be automatically transferred and used to populate a user input field of a screen by directly obtaining the value from another displayed screen, without requiring manual input or connection and communication with a backend database. As a result, input errors are minimized, time (and corresponding computing resources such as power) consumption is reduced, user convenience is increased, and network resources are conserved.

Figure 2:
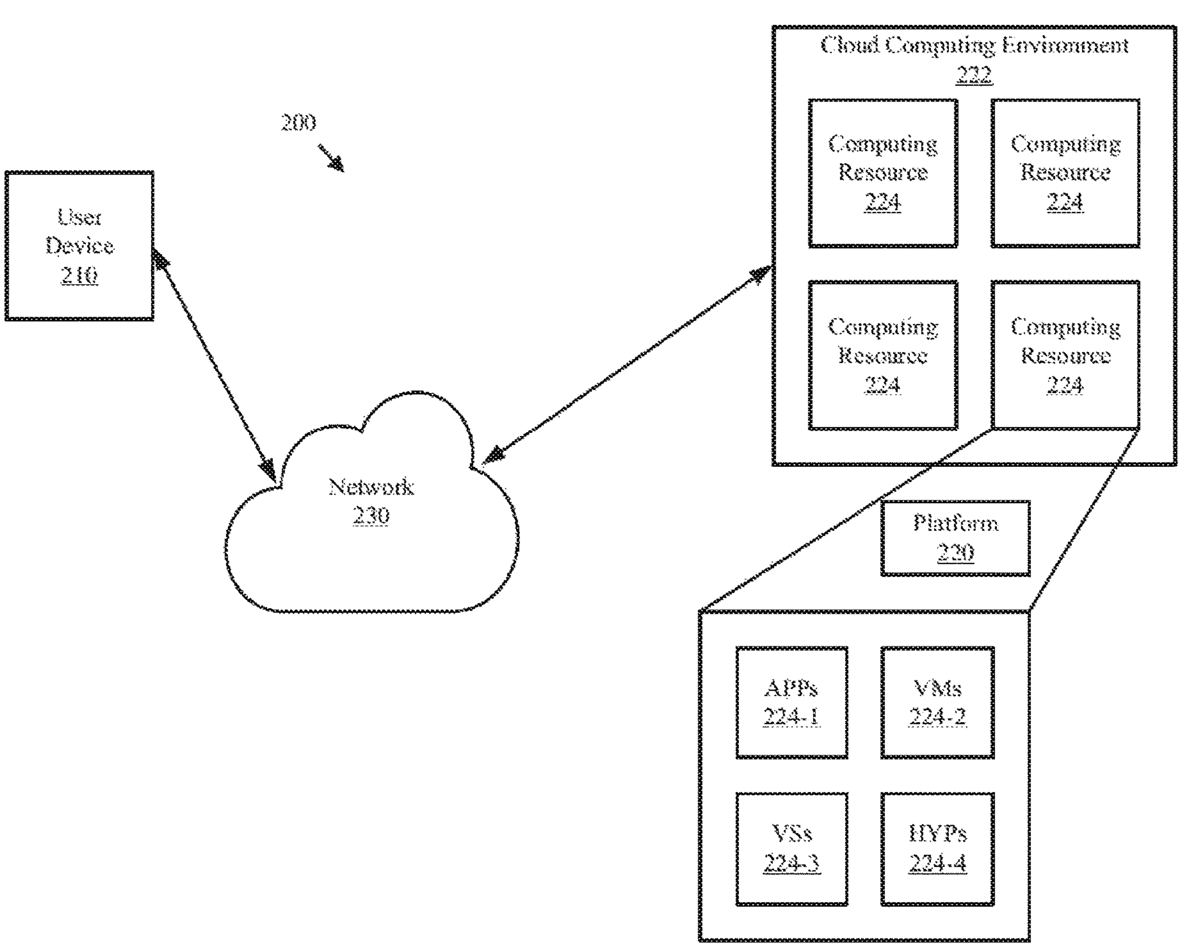
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections. In embodiments, any of the functions and operations described with reference to FIG. 1 above may be performed by any combination of elements illustrated in FIG. 2.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of receiving, generating, storing, processing, and/or providing information. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 may not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, a cluster of computing devices, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
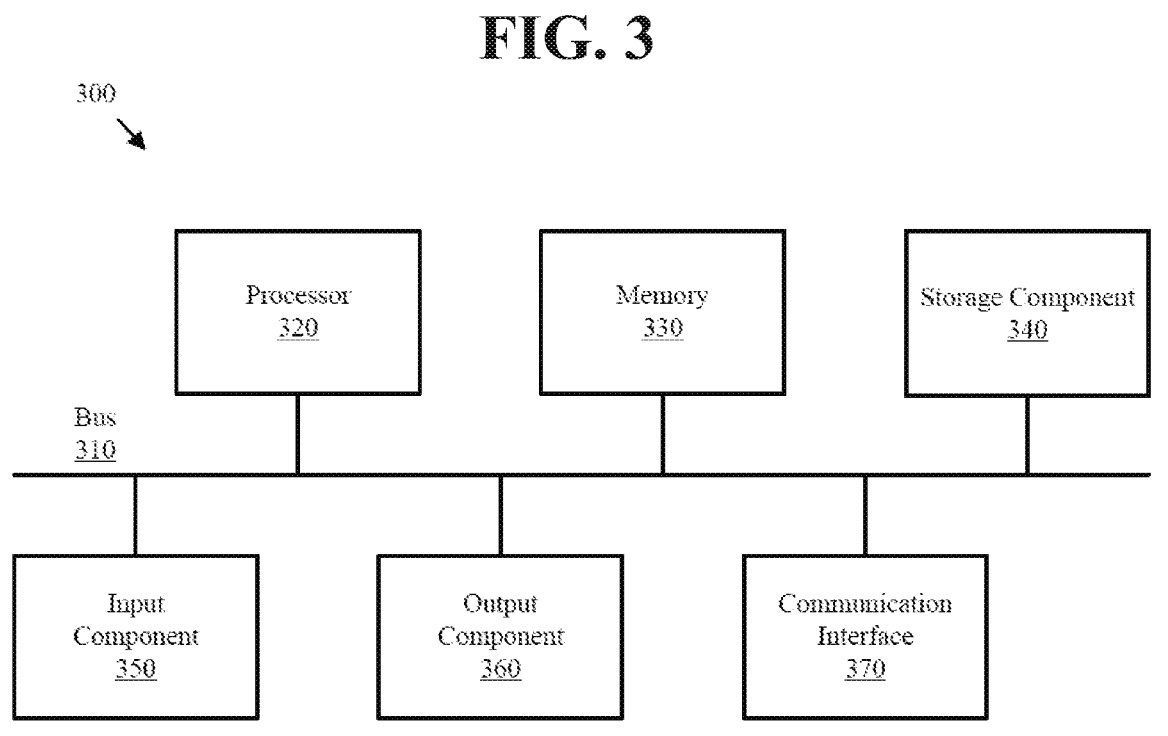

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 may be implemented in hardware, firmware, or a combination of hardware and software. Processor 320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In embodiments, any one of the operations or processes of FIG. 1 may be implemented by or using any one of the elements illustrated in FIGS. 2-3.

Figure 4:
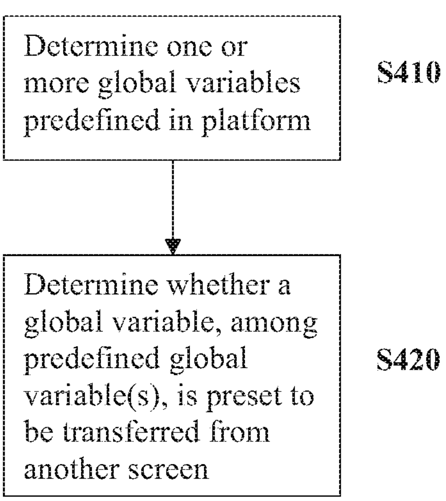
FIG. 4 is a flowchart of an example process for determining whether a global variable is included for a user input field of an output screen, according to an embodiment.

FIG. 4 is a flowchart of an example process for determining whether a global variable is included for a user input field of an output screen (e.g., second screen), according to an embodiment. For example, the method shown in FIG. 4 may correspond to operation S130 in FIG. 1.

Referring to FIG. 4, in operation S410, one or more global variables predefined in the platform (e.g., application platform) are obtained or determined. In this regard, a user may predefine one or more global variables in the platform via a user interface (UI) screen, such as shown in FIG. 5.

Figure 5:
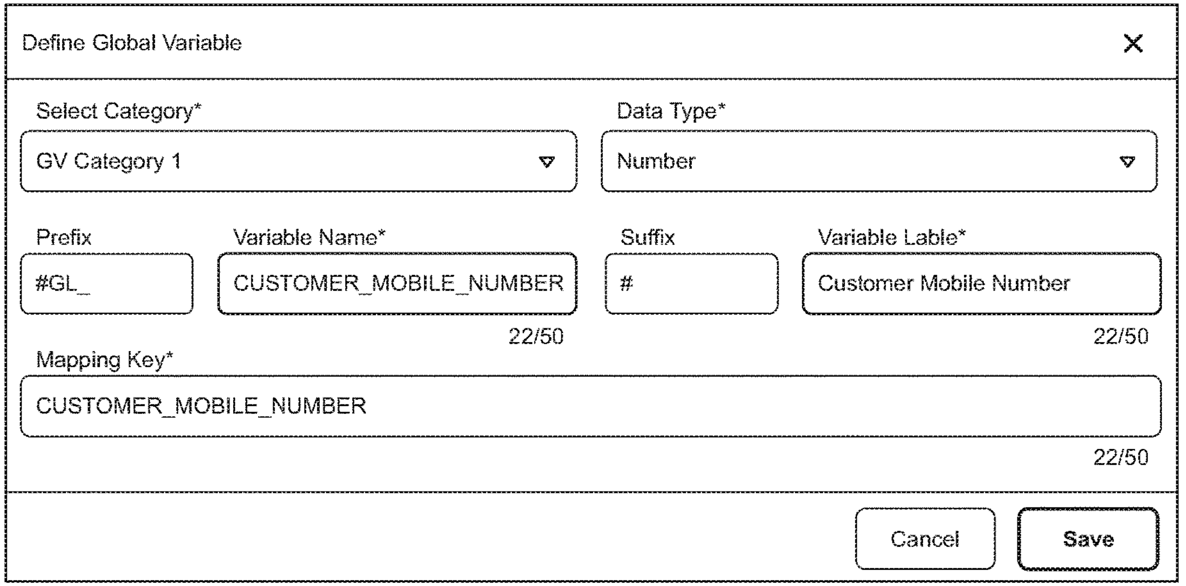
FIG. 5 illustrates an example user interface (UI) screen for defining and registering a global variable in a platform, according to an embodiment.

FIG. 5 illustrates an example UI screen for defining and registering a global variable in a platform, according to an embodiment. The UI screen in FIG. 5 may be provided by a third application or by either of the first and second applications to register, define, and store a global variable for the platform. The UI screen of FIG. 5 is merely one example, and other embodiments may include less, more, or different input fields for defining the global variable.

Referring to FIG. 5, in an example use case, a variable (e.g., a customer's mobile number) may be defined in the first application and then registered or stored in memory as a global variable (e.g., in a third application). The global variable may be defined with a mapping key (e.g., "CUSTOMER_MOBILE_NUMBER") as a common identifier keyed to the variable. Further, the global variable may be defined with a label to correspond to a user input field of screens in which the global variable is included. Accordingly, the global variable may be defined or included in correspondence with a user input field (labeled "Customer Mobile Number") of a screen (second screen) of the second application.

Moreover, referring to FIG. 5, the global variable may be assigned a category. In other words, the global variables may be defined or utilized on a category-basis. In this regard, different applications or different screens of an application may be assigned or defined with different categories from among a plurality of categories (or a plurality of predetermined/predefined categories).

Referring back to FIG. 4, in operation S420, it is determined whether a global variable (or whether any global variables), from among the one or more global variables predefined in the platform, is preset to be transferred from another screen to the second screen. According to an embodiment, the second screen (or a category to which the second screen or the second application belongs) may be preconfigured or set by a user to subscribe to a global variable. That is, the second screen (or a category to which the second screen or the second application belongs) may be preconfigured to obtain a published value of a global variable, i.e., to fetch (or attempt to fetch), from another open screen, the value for a global variable. In this case, in accordance with an embodiment, upon opening the second screen, the second application will create an event bus with the first screen and listen for the respective mapping key of the global variable published by the first application into the event bus (e.g., a key-value pair published by the first application).

Figure 6:
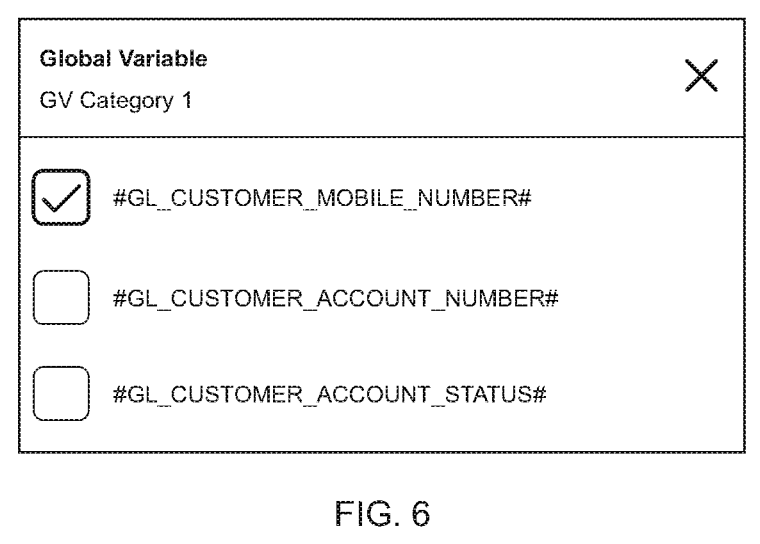

FIG. 6 illustrates an example UI screen for setting or selecting one or more global variables from among predefined global variables to be transferred from another screen to the second screen, according to an embodiment.

The UI screen in FIG. 6 may be provided by a third application or by either of the first and second applications.

Referring to FIG. 6, the predefined global variables that are listed may be all the global variables predefined in the platform, or may be global variables predefined with the same category that the second screen or the second application belongs to. Via the UI screen shown by way of example in FIG. 6, a user (e.g., administrator, application developer, etc.) may select which global variables to fetch or subscribe to. In various example embodiments, this setting may be made on a screen basis (such that different execution screens of execution sessions of the same or different applications may be preset with different global variables to transfer thereto), a category basis, or an application basis.

As can be seen in FIG. 6, according to an embodiment, the setting of global variables to be transferred (or subscribed to) is made with respect to the mapping keys defined for the global variables. Accordingly, when the second screen obtains the value of the global variable, it may do so using the mapping key. For example, as described above, the global variables may be predefined or registered in the platform with mapping keys. In this case, the method may determine whether the first screen includes the global variable and may obtain a value mapped to the key corresponding to the global variable in the first screen. For example, the first application may publish (e.g., on an event bus, channel or tunnel with the second application, etc.) any values for keys (mapping keys) of global variables defined in the platform (or set for transfer in the platform), and the second application may obtain the published value(s) for any keys set or selected for transfer, such as via the UI screen of FIG. 6.

Figure 7A:
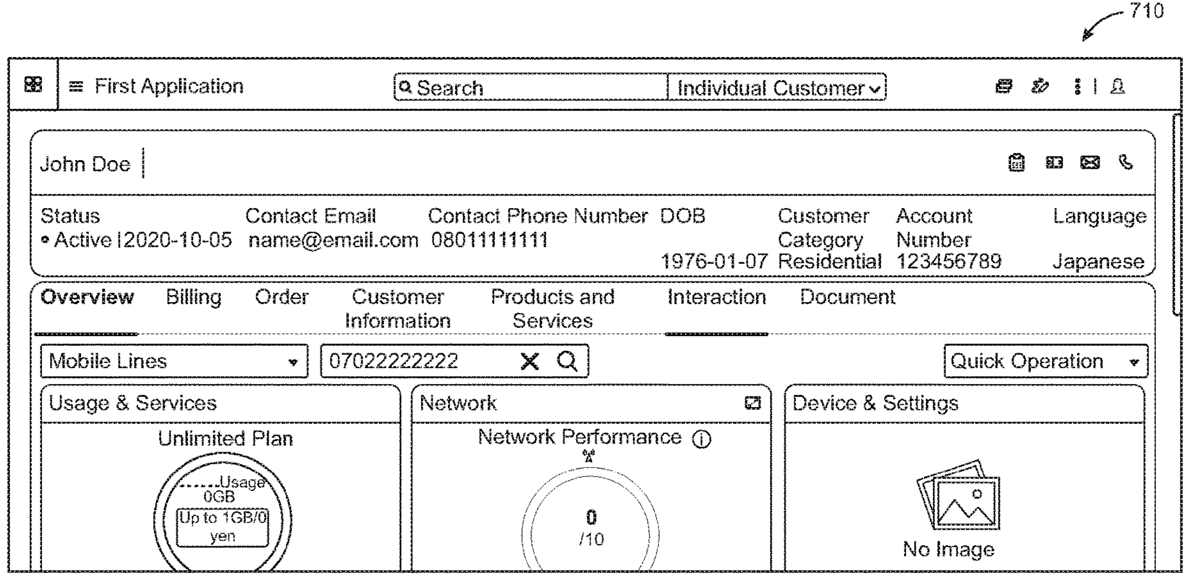
FIGS. 7A and 7B illustrate example screens in which information is automatically transferred, according to an embodiment.
Figure 7B:
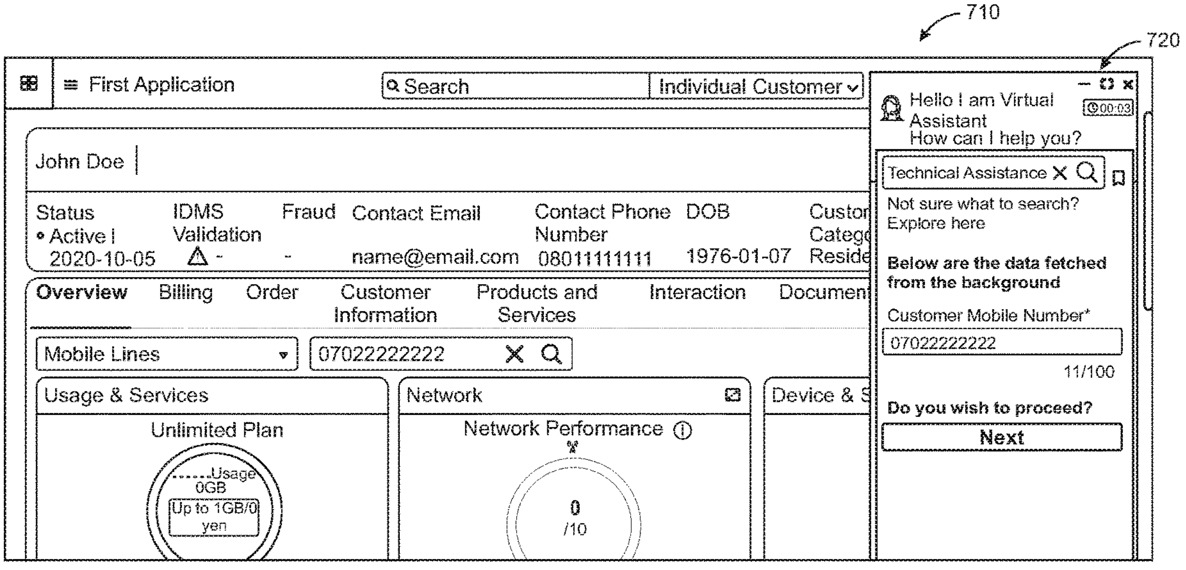

FIGS. 7A and 7B illustrate example screens in which information is automatically transferred, according to an embodiment. In the example of FIGS. 7A and 7B, the first and second applications respectfully correspond to a customer account application in which customer account information is displayed or visualized and a virtual assistant application for providing assistance with respect to a particular customer. For example, the second application may be a virtual assistant for a customer support agent, providing different execution screens corresponding to different solutions or schemas (e.g., a predefined series of actions for a customer officer to take for a particular problem or customer request). It is understood that this is merely an example, and other embodiments are not limited to this use case. That is, other embodiments may be applied to any types of applications having screens through which information is provided or is to be input.

FIG. 7A illustrates a first screen 710 of a first application, which in this example is a customer account application. FIG. 7B illustrates a second screen 720 of a second application. As can be seen in FIG. 7B, the second screen 720 is overlaid as a pop-up window over the first screen. As an example, the two applications may both be microservices-based web applications, and the first and second screens 710 and 720 may both be displayed in a same tab of a browser window.

In the present example, the second screen 720 includes a user input field labeled "Customer Mobile Number," that corresponds to a predefined global variable. The first screen 710 similarly includes the same variable (which may be labeled "Customer Mobile Number" in the backend). Because the customer mobile number is set as a global variable to be automatically fetched or transferred from another open screen of an application, the second application automatically fetches or obtains the value for that global variable (i.e., the customer's mobile number) from the first screen 710 and automatically inputs it to the user input field. Here, the fetched value may be input in an editable format.

According to an embodiment, if the first screen 710 does not expose or include that global variable or a value therefor, then the automatic fetching will fail or not occur, and the user input field in the second screen 720 will remain blank. In this case, a user may manually input the value of the variable. Further, in this case, an error message may be output (e.g., "Data unable to be fetched from the background").

Figure 8:
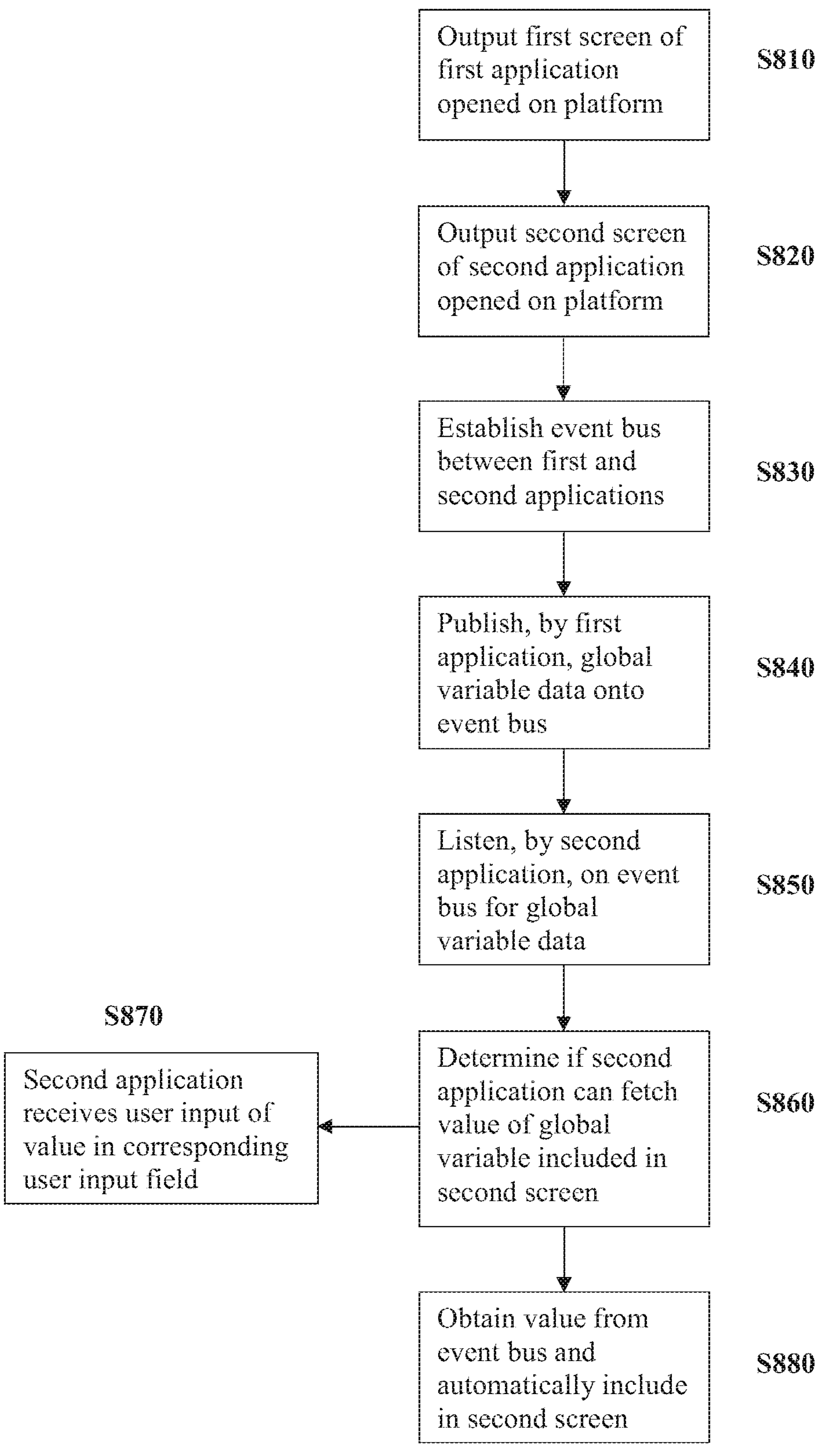
FIG. 8 is a flowchart of an example process for automatically transferring information using an event bus between different applications opened on a platform, according to an embodiment.

FIG. 8 is a flowchart of an example process for automatically transferring information using an event bus between different applications opened on a platform, according to an embodiment.

Referring to FIG. 8, in operation S810, a first application is opened and a first screen thereof is output for display (e.g., on a client terminal). For example, the first application may be an application built and deployed in accordance with a microservices architecture on one or more servers, and a screen thereof (e.g., a micro frontend) may be displayed on a client terminal (e.g., on a web browser of the client terminal).

In operation S820, a second application is opened and a second screen thereof is output for display. For example, the second application may be an application built and deployed in accordance with the microservices architecture on one or more servers, and a screen thereof (e.g., a micro frontend) may be displayed on the client terminal (e.g., on a web browser of the client terminal). In an embodiment, the first and second screens may both be displayed with a same window, e.g., within a same tab of a browser. In this case, the two screens may be displayed in a tiled or side-by-side manner, the second screen may be displayed as a pop-up window overlaid on the first screen, etc.

In operation S830, an event bus is established (e.g., by the second application based on opening of the second application or output of the second screen) between the first and second applications. The event bus may be an interface (i.e., logical interface) established (e.g., with one or more APIs) between two applications. In an embodiment, the event bus may be configured to support a publish/subscribe model between applications. In this case, one application (or microservice) may publish an event on the event bus based on some trigger or programming logic (such as the identifying, determining, and/or loading of a global variable on an execution screen of the application), and another application may subscribe to that event on the event bus. When the other application reads the event off of the bus, it can update its own entities or parameters accordingly. The two applications may utilize APIs to establish, connect to, subscribe, unsubscribe, and/or publish events. Events (e.g., a mapping key value pair) may be periodically published to the bus and/or may be stored in a memory or storage space for the bus (e.g., until the bus is closed upon a closing of at least one of the first and second applications).

In operation S840, the first application publishes one or more global variable data into the event bus through respective mapping keys (i.e., the mapping keys are utilized on the event bus to hold the values mapped to a global variable/key). For example, the first application may determine whether an open screen thereof (i.e., the first screen) includes any predefined global variables. In various example embodiments, the first application may make this determination with respect to all global variables predefined in the platform, with respect to all global variables predefined with a particular category (e.g., a category corresponding to the second application or the second screen that is being output), or with respect to all global variables included in the second screen. Upon determining that the first screen includes a global variable, the first application publishes the corresponding global variable data into the event bus. For example, the first application publishes a key-value pair using the mapping key (i.e., a pair that includes the mapping key for the global variable and a corresponding value of the variable output on the first screen).

In operation S850, the second application listens on the event bus for the respective mapping key value-pairs for any global variables included in the second screen. In this regard, the second application may determine one or more global variables set for transfer with respect to the second screen, and may listen for the values of these variables on the event bus. It is understood that operations S840 and S850 may occur in any order, simultaneously, or substantially simultaneously.

In operation S860, the second application determines whether it can fetch the values for any global variables included in the second screen, from the event bus. If not (e.g., if the first application does not publish the corresponding mapping key-value pair), then the second application receives a manual user input of the value(s) in a user input field for the global variable(s) in operation S870. If, however, the second application can fetch the value(s), the second application fetches or obtains the value(s) from the event bus and auto populates or fills the corresponding user input field(s) in the second screen in operation S880. In this case, the value(s) may be input in an editable format, such that the user can validate or confirm the auto input value(s) and make any edits if needed.

According to example embodiments, a screen of an application can automatically obtain and input values for user input fields directly from another open screen of another application. As a result, the application does not need to connect to a database, thereby conserving network resources and bandwidth. Further, because the values are automatically obtained and input, the potential for an incorrect input of information (e.g., due to human error) is reduced and time required for manual input is saved.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method, performed by at least one processor of a computing device, for automatically transferring information from one screen to another, the method comprising:

outputting a first screen of a first application opened on a platform;

outputting a second screen of a second application opened on the platform, while the first screen is output;

determining whether a global variable is included for a user input field of the second screen;

based on determining that the global variable is included for the user input field of the second screen, obtaining a value of the global variable from the first screen; and including the obtained value of the global variable in the user input field, of the outputted second screen, corresponding to the global variable.

2. The method according to claim 1, wherein the determining whether the global variable is preset to be transferred from another screen to the second screen comprises:

determining one or more global variables predefined in the platform; and determining whether the global variable, from among the one or more global variables predefined in the platform, is preset to be transferred from another screen to the second screen.

3. The method according to claim 2, wherein the determining whether the global variable is preset to be transferred comprises determining whether a mapping key is set for automatically transferring the value of the global variable, from among the one or more global variables, from an open screen of another application to the second screen.

4. The method according to claim 3, wherein the obtaining the value of the global variable from the first screen comprises obtaining the value of the global variable using the mapping key.

5. The method according to claim 1, wherein the first screen and second screen are both output for display within a same tab of a browser.

6. The method according to claim 1, wherein the first screen and the second screen are two different micro frontends of a same microservices domain.

7. The method according to claim 6, wherein the obtaining the value of the global variable from the first screen comprises determining whether the value of the global variable is published by the first application on an event bus.

8. The method according to claim 7, wherein the obtaining the value of the global variable from the first screen further comprises obtaining the value from the event bus.

9. The method according to claim 1, wherein:

at least one other global variable is set to be included for a third screen of the second application, and not included for the second screen; and the second screen and the third screen correspond to different execution sessions of the second application.

10. An apparatus for automatically transferring information from one screen to another within a platform, the apparatus comprising:

a memory storing instructions; and at least one processor configured to execute the instructions to:

control to output a first screen of a first application opened on a platform;

control to output a second screen of a second application opened on the platform, while the first screen is output;

determine whether a global variable is included for a user input field of the displayed second screen;

based on determining that the global variable is included for the user input field of the second screen, obtain a value of the global variable from the first screen; and include the obtained value of the global variable in the user input field, of the outputted second screen, corresponding to the global variable.

11. The apparatus according to claim 10, wherein the at least one processor is further configured to execute the instructions to:

determine one or more global variables predefined in the platform; and determine whether the global variable, from among the one or more global variables predefined in the platform, is preset to be transferred from another screen to the second screen.

12. The apparatus according to claim 11, wherein the at least one processor is further configured to execute the instructions to determine whether a mapping key is set for automatically transferring the value of the global variable, from among the one or more global variables, from an open screen of another application to the second screen.

13. The apparatus according to claim 12, wherein the at least one processor is further configured to execute the instructions to obtain the value of the global variable using the mapping key.

14. The apparatus according to claim 10, wherein the first screen and second screen are both output for display within a same tab of a browser.

15. The apparatus according to claim 10, wherein the first screen and the second screen are two different micro frontends of a same microservices domain.

16. The apparatus according to claim 15, wherein the at least one processor is further configured to execute the instructions to determine whether the value of the global variable is published by the first application on an event bus.

17. The apparatus according to claim 16, wherein the at least one processor is further configured to execute the instructions to obtain the value of the global variable from the event bus.

18. The apparatus according to claim 10, wherein:

at least one other global variable is set to be included for a third screen of the second application, and not included for the second screen; and the second screen and the third screen correspond to different execution sessions of the second application.

19. A non-transitory computer-readable recording medium having recorded thereon instructions executable by at least one processor to perform a method for automatically transferring information from one screen to another within a platform, the method comprising:

outputting a first screen of a first application opened on a platform;

outputting a second screen of a second application opened on the platform, while the first screen is output;

determining whether a global variable is included for a user input field of the second screen;

based on determining that the global variable is included for the user input field of the second screen, obtaining a value of the global variable from the first screen; and including the obtained value of the global variable in the user input field, of the outputted second screen, corresponding to the global variable.

20. The non-transitory computer-readable recording medium according to claim 19, wherein the determining whether the global variable is preset to be transferred from another screen to the second screen comprises:

determining one or more global variables predefined in the platform; and determining whether the global variable, from among the one or more global variables predefined in the platform, is preset to be transferred from another screen to the second screen.

* * * * *